United States Patent
Someya et al.

(10) Patent No.: US 6,466,269 B1
(45) Date of Patent: Oct. 15, 2002

(54) VIDEO SIGNAL CONVERTER, CONVERSION METHOD OF VIDEO SIGNAL, IMAGE DISPLAY UNIT USING THEM AND TELEVISION RECEIVER

(75) Inventors: Ikuo Someya, Tokyo; Akira Shimizu, Saitama; Nobuo Ueki, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/406,491

(22) Filed: Sep. 27, 1999

(30) Foreign Application Priority Data

Sep. 29, 1998 (JP) .......................................... 10-275970

(51) Int. Cl.⁷ ................................................ H04N 7/01
(52) U.S. Cl. ....................... 348/448; 348/452; 348/458
(58) Field of Search ................................. 348/441, 443, 348/448, 452, 458; H04N 7/01

(56) References Cited

U.S. PATENT DOCUMENTS 5,838,381 A * 11/1998 Kasahara ..................... 348/458
6,144,412 A * 11/2000 Hirano ........................ 348/441

FOREIGN PATENT DOCUMENTS

| EP | 0 762 737 A2 | 3/1997 |
| EP | 0 782 333 A2 | 7/1997 |
| EP | 0 837 601 A2 | 4/1998 |
| EP | 0 843 475 A1 | 5/1998 |

* cited by examiner

*Primary Examiner*—Sherrie Hsia
(74) *Attorney, Agent, or Firm*—Frommer Lawrence & Haug LLP; William S. Frommer; Darren M. Simon

(57) ABSTRACT

This invention relates to a video signal converter, a conversion method of video signal, respectively suitable to be applied when a video signal according to National Television System Committee (NTSC) is illustratively converted to a video signal corresponding to an extended graphics array (XGA), an image display unit using the converter and conversion method, and a television receiver. A signal in each field of a video signal $S_{NT}$ according to NTSC in which the number of lines is 252.5 (effective line number is 240) is converted to a signal in each frame of a video signal $S_{XG}$ corresponding to XGA in which the number of lines is 840 (effective line number is 768). A video signal converter is composed of an image adaptive double-speed conversion circuit for converting a video signal $S_{NT}$ to a video signal $S_{2N}$ according to an interlaced scanning method in which the number of lines is doubled and an interpolation circuit for converting the video signal $S_{2N}$ to a video signal $S_{XG}$. A video signal $S_{2N}$ acquired by image adaptive conversion processing is a video signal of high image quality. A video signal $S_{XG}$ acquired by interpolation processing based upon the video signal $S_{2N}$ is a video signal of high image quality free of the deterioration of the quality of an image, compared with a video signal $S_{XG}$ acquired only by interpolation processing based upon a video signal $S_{NT}$.

11 Claims, 12 Drawing Sheets

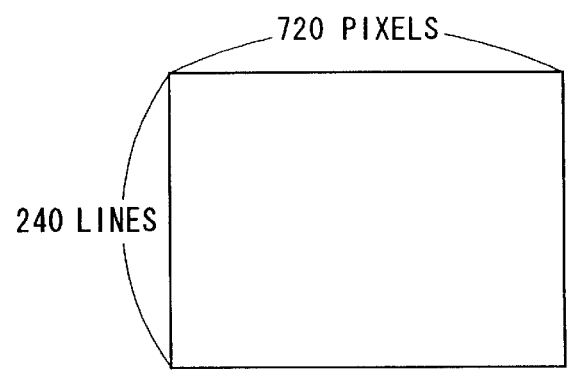
FIG. 1A
($S_{NT}$)
RELATED ART
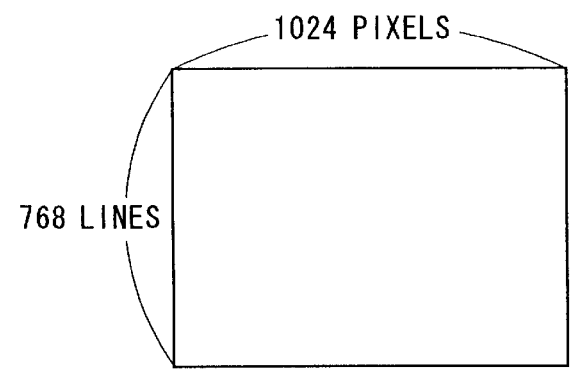
FIG. 1B
($S_{XG}$)
RELATED ART
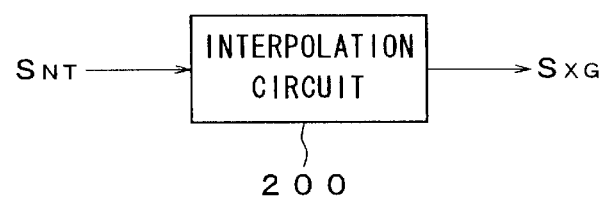
FIG. 2
RELATED ART
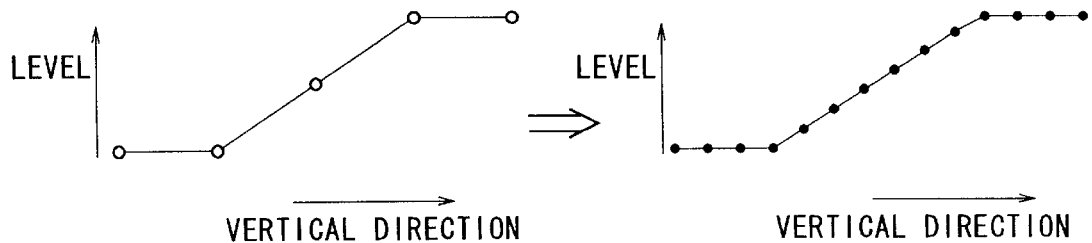
FIG. 3A ($S_{NT}$)
RELATED ART
FIG. 3B ($S_{XG}$)
RELATED ART

F I G. 6 A
($S_{NT}$ : 525 i )
262.5 LINES
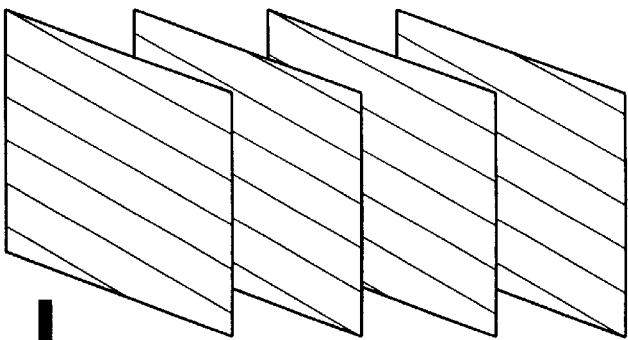
F I G. 6 B
($S_{2N}$ : 1050 i )
525 LINES
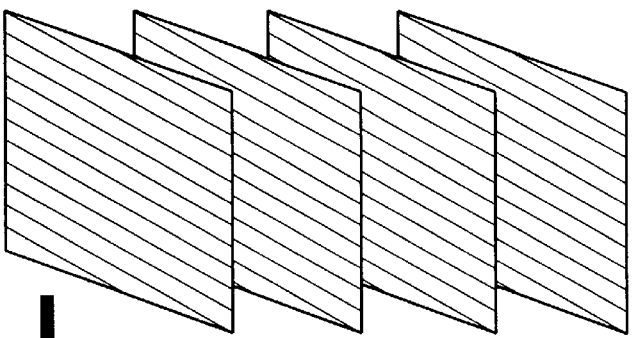
F I G. 6 C
($S_{XG}$)
840 LINES
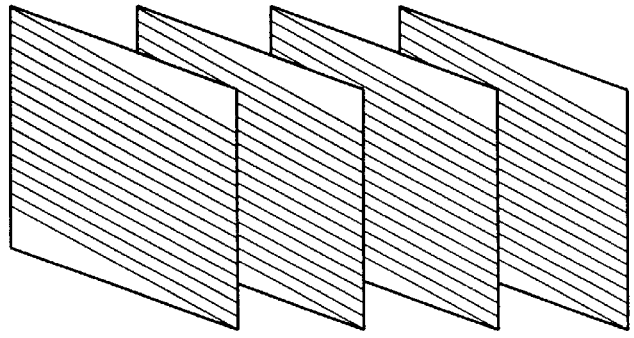

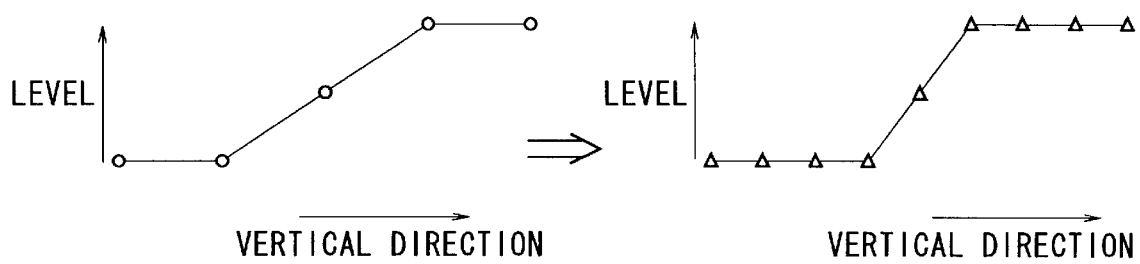
F I G. 7A (S_NT)   F I G. 7B (S_2N)
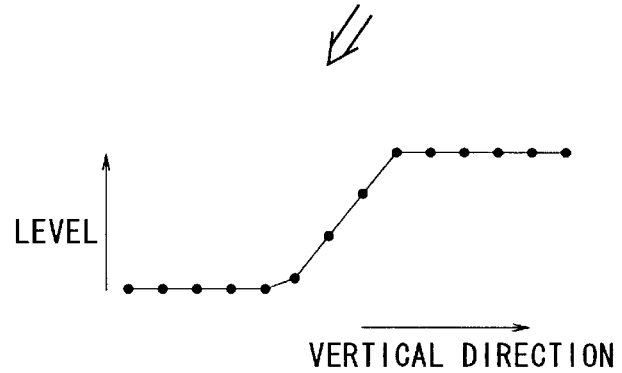
F I G. 7C (S_XG)

F I G. 1 1
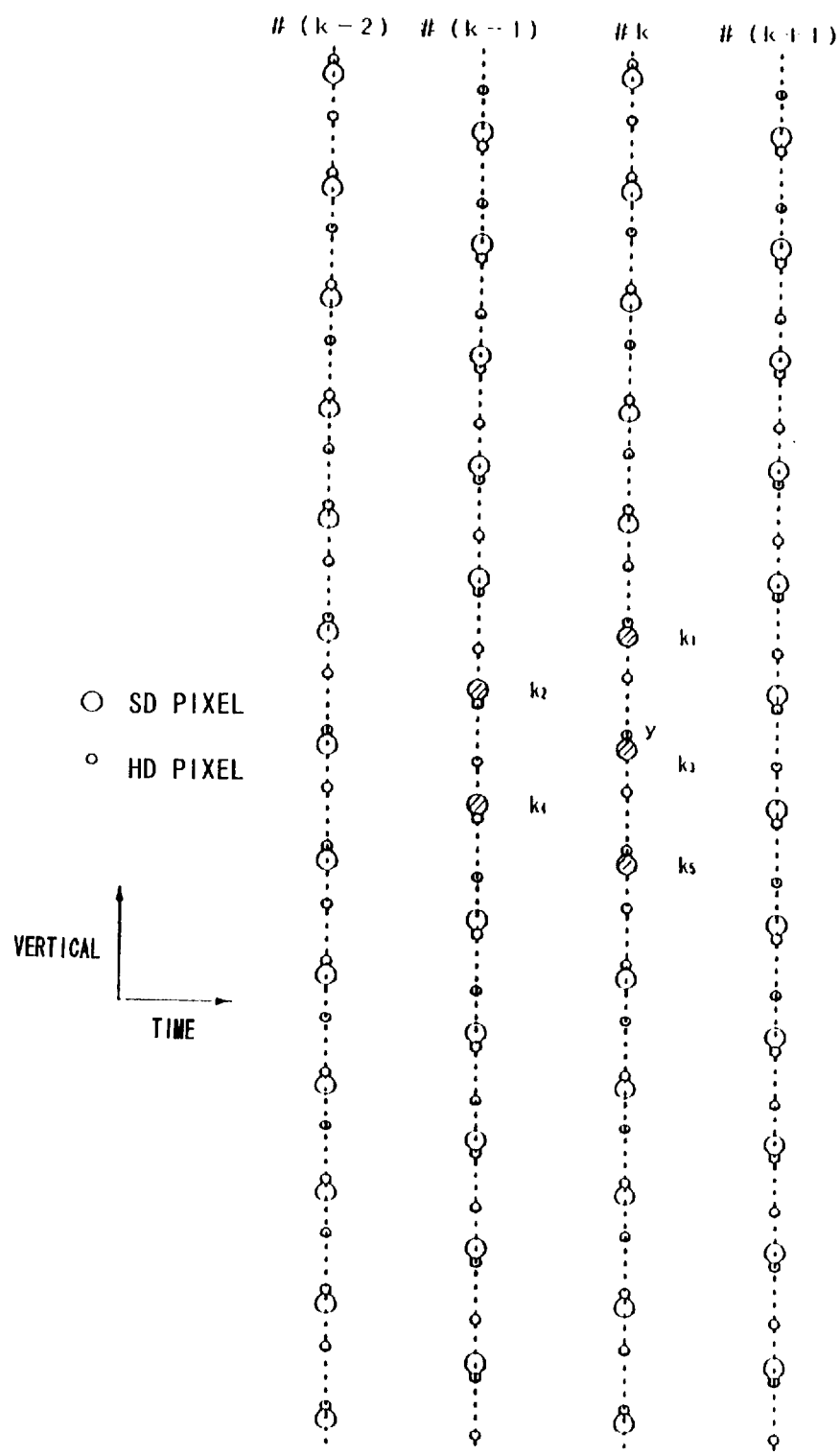

VIDEO SIGNAL CONVERTER, CONVERSION METHOD OF VIDEO SIGNAL, IMAGE DISPLAY UNIT USING THEM AND TELEVISION RECEIVER

BACKGROUND OF THE INVENTION

1. Technical Field of the Invention

The present invention relates to a video signal converter and a conversion method of video signal, respectively suitable to be applied when a video signal according to National Television System Committee (NTSC) is illustratively converted to a video signal corresponding to an extended graphics array (XGA), as well as an image display unit using the converter and conversion method, and a television receiver.

More particularly, the present invention relates to a video signal converter and others wherein a video signal of high image quality can be acquired in case the number of lines in a vertical direction or the number of pixels in a horizontal direction of the input video signal is converted so that it exceeds double for example, by increasing the number of lines in a vertical direction or the number of pixels in a horizontal direction thereof by n times according to an image adaptive conversion processing and further, increasing it by m times according to another conversion processing.

2. Description of the Related Art

Heretofore, devices for converting a video signal $S_{NT}$ according to NTSC to a video signal $S_{XG}$ corresponding to XGA and displaying an image on, for example, a liquid crystal display based upon the video signal SXG corresponding to XGA are proposed. The video signal $S_{NT}$ according to NTSC means a video signal according to an interlaced scanning method, in which the number of lines in a vertical direction thereof is 525. In such the video signal $S_{NT}$, as shown in FIG. 1A, the number of effective lines in the vertical direction of each field is 240 and when a sampling frequency is 13.5 MHz, the number of effective pixels in a horizontal direction is 720. In the meantime, a video signal $S_{XG}$ corresponding to XGA is a video signal, for example, according to a sequential scanning method. In such video signal $S_{XG}$, as shown in FIG. 1B, the number of effective lines in a vertical direction is 768 and the number of effective pixels in a horizontal direction is 1024.

Heretofore, an interpolation circuit 200 as shown in FIG. 2 is used as a video signal converter for acquiring a video signal $S_{XG}$ corresponding to XGA based upon a video signal $S_{NT}$ according to NTSC. In the interpolation circuit 200, a video signal SXG corresponding to XGA is generated by applying interpolation processing such as the nearest interpolation, linear interpolation and cubic interpolation to a video signal $S_{NT}$ according to NTSC.

As described above, the number of effective lines in the vertical direction of each field of the video signal $S_{NT}$ according to NTSC is 240 while the number of effective lines in a vertical direction of a video signal $S_{XG}$ corresponding to XGA is 768. Therefore, line number conversion processing of 3.2 times in relation to a vertical direction, in which 240 lines are converted to 760 lines, is executed in the interpolation circuit 200. If conversion exceeding double as described above is performed, the sharpness of an image is lost and an the quality of an image is deteriorated even if interpolation processing including many taps is used. 'o' in FIG. 3A shows a video signal $S_{NT}$ according to NTSC. '●' in FIG. 3B shows a video signal $S_{XG}$ corresponding to XGA after line number conversion. However, these indicate that the number of pixels in a vertical direction is merely increased.

The deterioration of the quality of an image described above is also similarly caused in case processing for converting the number of pixels in a horizontal direction to the number exceeding double is executed. Similarly, if a video signal $S_{XG}$ corresponding to XGA is acquired based upon a video signal $S_{PL}$ according to Phase Alternation by Line color television (PAL) with the number of lines in a vertical direction of 625, which is a video signal according to an interlaced scanning method, the quality of an image is also deteriorated.

The object of the present invention is to provide a video signal converter for acquiring a video signal of high image quality even if the number of lines in a vertical direction or the number of pixels in a horizontal direction of a video signal is converted to, for example, the number exceeding double, and others.

SUMMARY OF THE INVENTION

In carrying out the invention in one preferred mode, we provide a video signal converter comprising an image adaptive first converter for increasing the number of lines in a vertical direction or the number of pixels in a horizontal direction of a first video signal by n times to acquire a second video signal, and a second converter for increasing the number of lines in the vertical direction or the number of pixels in the horizontal direction of the second video signal by m times to acquire a third video signal.

Also, as another preferred mode of the invention, we provide a video signal conversion method comprising a first conversion step of increasing the number of lines in a vertical direction or the number of pixels in a horizontal direction of a first video signal by n times to acquire a second video signal by applying an image adaptive conversion processing to the first video signal, and a second conversion step of increasing the number of lines in the vertical direction or the number of pixels in a horizontal direction of the second video signal by m times to acquire a third video signal by applying a conversion processing to the second video signal.

As further preferred mode of the invention, we provide an image display unit comprising a video signal converter for converting the number of lines or the number of pixels of an input video signal to acquire an output video signal, and an image display for displaying an image based upon said output video signal. This video signal converter comprises an image adaptive first converter for increasing the number of lines or the number of pixels of a first video signal as said input video signal by n times to acquire a second video signal, and a second converter for increasing the number of lines or the number of pixels of said second video signal by m times to acquire a third video signal as said output video signal.

As further preferred mode of the invention, we provide a television receiver comprising a receiving section for receiving a television broadcasting signal, a video signal converting section for acquiring a converted video signal by converting the number of lines or the number of pixels of a received video signal received by said receiving section and an image display for displaying an image based upon said converted video signal. The video signal converting section comprises an image adaptive first converter for increasing the number of lines or the number of pixels of a first video signal as said received video signal by n times to acquire a second video signal and a second converter for increasing the number of lines or the number of pixels of said second video signal by m times to acquire a third video signal as said converted video signal.

According to the present invention, the image adaptive first converter performs image adaptive conversion processing to the first video signal to acquire the second video signal wherein the number of lines in a vertical direction or the number of pixels in a horizontal direction of the first video signal is increased by n times, for example, double. In the image adaptive conversion processing, the number of lines in a vertical direction or the number of pixels in a horizontal direction is converted not by mere interpolation processing using neighboring pixel signals but by acquiring required pixel signals according to estimation operation using, for example, a linear estimation expression. The second converter performs conversion processing to the second video signal to acquire the third video signal wherein the number of lines in a vertical direction or the number of pixels in a horizontal direction of the second video signal is increased by m times. In the conversion processing, the number of lines in a vertical direction or the number of pixels in a horizontal direction of the second video signal is converted by mere interpolation processing using, for example, neighboring pixel signals.

As described above, the second video signal is acquired by applying image adaptive conversion processing to the first video signal so that the second video signal has high image quality. The third video signal is acquired by applying conversion processing to the second video signal. The third video signal in which the number of lines in a vertical direction or the number of pixels in a horizontal direction of the first video signal is increased by 'n×m' times, is obtained by applying mere interpolation processing to the second video signal. The third video signal has high image quality and is free of the deterioration of the quality of an image.

In the invention, the image adaptive conversion processing is performed to the first video signal to acquire the second video signal wherein the number of lines in a vertical direction or the number of pixels in a horizontal direction of the first video signal is increased by n times. The conversion processing by, for example, interpolation is performed to the second video signal to acquire the third video signal wherein the number of lines in a vertical direction or the number of pixels in a horizontal direction of the second video signal is increased by m times. Thereby, the third video signal is finally increased by 'n×m' times of the first video signal in the number of lines in a vertical direction or the number of pixels in a horizontal direction. Therefore, even if the final conversion magnification of the number of lines in a vertical direction or the number of pixels in a horizontal direction is changed, conversion can be easily realized only by changing conversion magnification m in interpolation processing. That is, even if the final conversion magnification of the number of lines in a vertical direction or the number of pixels in a horizontal direction is changed, the existing image adaptive converter, for example, a double-speed converter can be used.

A further understanding of the nature and advantages of the invention may be realized by reference to the following portions of the specification and drawings.

BRIEF DESCRIPTION OF THE DRAWINGS

FIGS. 1A and 1B are illustrations each showing the number of effective lines and the number of effective pixels of a video signal according to NTSC and a video signal corresponding to XGA;

FIG. 2 is a block diagram showing a related interpolation circuit for converting a video signal $S_{NT}$ according to NTSC to a video signal $S_{XG}$ corresponding to XGA;

FIGS. 3A and 3B are illustrations explaining an operation of the related interpolation circuit;

FIGS. 6A to 6C are illustrations explaining an operation of the video signal converter;

FIGS. 7A to 7C are illustrations explaining an operation of the video signal converter;

FIG. 11 is a sketch drawing explaining SD pixel data used for classifying it into a space class;

DESCRIPTION OF THE PREFERRED EMBODIMENT

Figure 4:
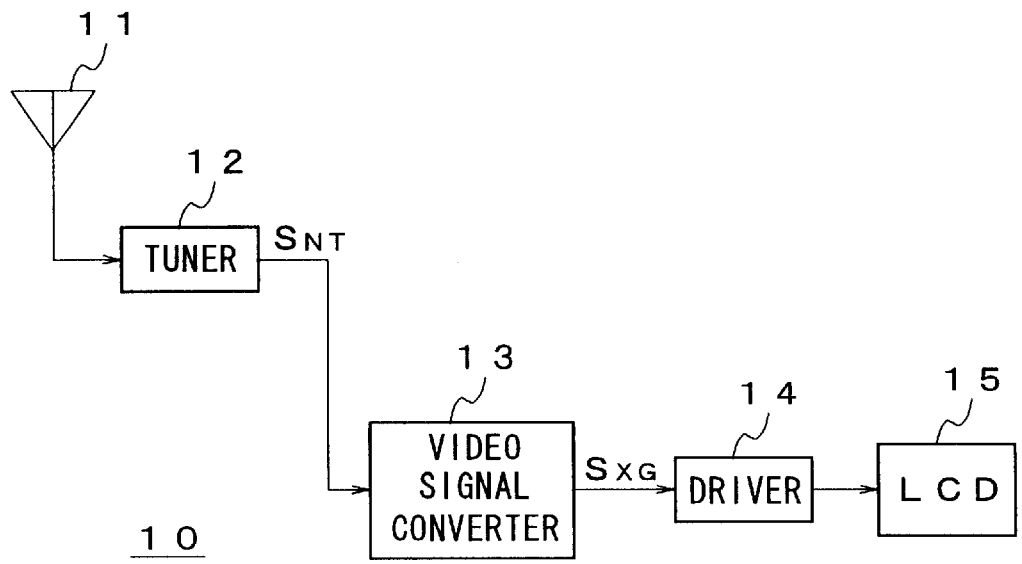
FIG. 4 is a block diagram showing the configuration of a television receiver embodying the invention.

Referring to the drawings, an embodiment of the present invention will be described below. FIG. 4 shows the configuration of a television receiver 10 embodying the invention. The television receiver 10 comprises a receiving antenna 11 and a tuner 12 for acquiring a video signal $S_{NT}$ according to NTSC by applying broadcasting station selecting processing, intermediate frequency amplifying processing, detection processing and others to a television broadcasting signal (an RF modulating signal) received by the receiving antenna 11.

The television receiver 10 also comprises a video signal converter 13 for performing processing for converting the number of lines in a vertical direction and the number of pixels in a horizontal direction to a video signal $S_{NT}$ received from the tuner 12 to acquire a video signal $S_{XG}$ corresponding to XGA, a liquid crystal display (LCD) 15 and a driver 14 for driving the LCD 15 based upon the video signal $S_{XG}$ so as to display on LCD 15 an image based upon the above video signal $S_{XG}$.

An operation of the television receiver 10 shown in FIG. 4 will be described below. The receiving antenna 11 receives a television broadcasting signal and supplies it to the tuner 12. In the tuner 12, an intermediate frequency signal relating to a television broadcasting signal of a predetermined channel selected by operation of a user for selecting a broadcasting station, is acquired from the received television broadcasting signal. Afterward, the tuner 12 applies detection processing to the intermediate frequency signal and then, a video signal $S_{NT}$ according to NTSC is acquired.

The tuner 12 transmits the video signal $S_{NT}$ according to NTSC to a video signal converter 13. The converter 13 performs the processing for converting the number of lines in a vertical direction and the number of pixels in a horizontal direction to the received video signal $S_{NT}$ and then, a video signal $S_{XG}$ corresponding to XGA is acquired. That is, a signal in each field of the video signal $S_{NT}$ according to NTSC has the number of lines of 252.5 (effective line number is 240) and the number of pixels of 858 (effective pixel number is 720). Such the signal is converted to a signal in each frame of a video signal $S_{XG}$ corresponding to XGA having the number of lines of 840 (effective line number is 768) and the number of pixels of 1220 (effective pixel number is 1024).

The video signal converter 13 transmits the video signal $S_{XG}$ corresponding to XGA to a driver 14 and then, the liquid crystal display 15 displays an image composed of '1024× 768' pixels on the basis of the video signal $S_{XG}$.

Next, referring to FIG. 5, the configuration of the video signal converter 13 will be described. The converter 13 comprises an image adaptive double-speed conversion circuit 100 for converting a video signal $S_{NT}$ according to NTSC to a video signal $S_{2N}$ according to the interlaced scanning method in which respective the number of lines in a vertical direction and the number of pixels in a horizontal direction are doubled, and an interpolation circuit 180 for converting the video signal $S_{2N}$ to a video signal $S_{XG}$ corresponding to XGA.

The interpolation circuit 180 is composed like the interpolation circuit 200, which is the related art as described above. That is, the interpolation circuit 180 carries out mere interpolation processing of the number of lines in a vertical direction or the number of pixels in a horizontal direction the video signal $S_{2N}$ using neighboring pixel signals such as the nearest interpolation, linear interpolation and cubic interpolation. In the meantime, the conversion circuit 100 carries out conversion of the number of lines in a vertical direction or the number of pixels in a horizontal direction of the video signal $S_{NT}$ by estimation operation, for example, using a linear estimation expression, not mere interpolation processing using neighboring pixel signals, to acquire required pixel signals.

An operation of the converter 13 shown in FIG. 5 will be described below. First, a video signal $S_{NT}$ according to NTSC is supplied to the image adaptive double-speed conversion circuit 100. The image adaptive double-speed conversion circuit 100 converts the number of lines in a vertical direction and the number of pixels in a horizontal direction of the received video signal $S_{NT}$ respectively to the double number according to image adaptive conversion processing and generates a video signal $S_{2N}$. In this case, a signal shown in FIG. 6A in each field of the video signal $S_{NT}$ according to NTSC having the line number of 262.5 (effective line number is 240) and the number of pixels of 858 (the number of effective pixels is 720) is converted to a signal shown in FIG. 6B in each field of the video signal $S_{2N}$ having line number of 525 lines (effective line number is 480) and number of pixels of 1716 pixels (the number of effective pixels is 1440).

Next, the video signal $S_{2N}$ is supplied to the interpolation circuit 180. The interpolation circuit 180 carries out the mere interpolation processing that the number of lines in a vertical direction and the number of pixels in a horizontal direction of the received video signal $S_{2N}$ are converted using neighboring pixel signals and generates a video signal $S_{XG}$ corresponding to XGA. In this case, a signal in each field of the video signal $S_{2N}$ having the line number of 525 (effective line number is 480) and the number of pixels of 1716 (the number of effective pixels is 1440) is converted to a signal in each frame of the video signal $S_{XG}$ corresponding to XGA having the line number of 840 (effective line number is 768) and the number of pixels of 1220 (the number of effective pixels is 1024).

Figure 5:
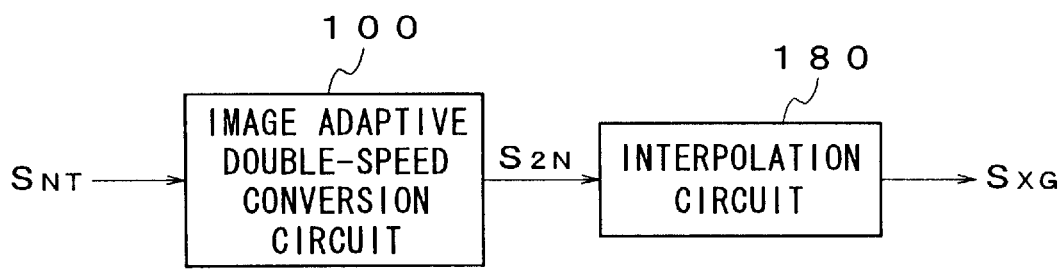
FIG. 5 is a block diagram showing the configuration of a video signal converter in the television receiver.

In the converter 13 shown in FIG. 5, line number conversion processing that 240 lines are finally increased up to 768 lines equivalent to 3.2 times in relation to a vertical direction is executed and in detail, in the image adaptive double-speed converter 100, the number of lines in a vertical direction of the received video signal $S_{2N}$ is doubled. Afterward, in the interpolation circuit 180, the number of lines in a vertical direction is further increased by 1.6 times. In this case, in the conversion circuit 100, the image adaptive conversion processing is executed so that the video signal $S_{2N}$ of high image quality (see 'Δ' in FIG. 7B) is acquired without depressing the video signal $S_{NT}$ (see '○' in FIG. 7A) according to NTSC. Therefore, the deterioration of the quality of an image is small, compared with a method in which the number of lines is increased by 3.2 times by mere interpolation processing as heretofore and a video signal $S_{XG}$ of high image quality (see '●' in FIG. 7C) corresponding to XGA is acquired.

Figure 8:
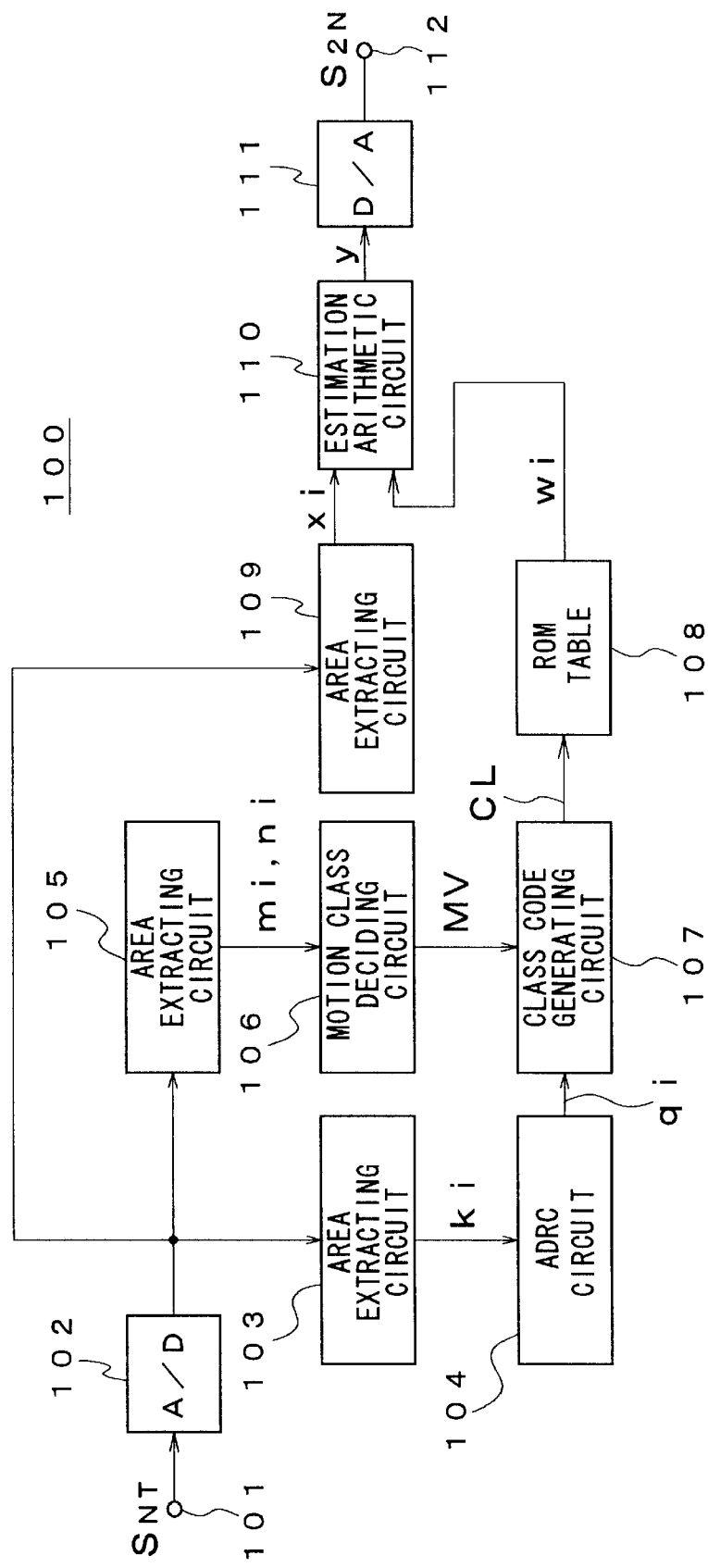
FIG. 8 is a block diagram showing the configuration of an image adaptive double-speed conversion circuit in the video signal converter.

Next, referring to FIG. 8, an example of the configuration of the image adaptive double-speed conversion circuit 100 will be described. The conversion circuit 100 comprises an input terminal 101 for inputting a video signal $S_{NT}$ according to NTSC and an A/D converter 102 for converting the video signal $S_{NT}$ to a digital signal (hereinafter called SD pixel data).

The conversion circuit 100 also comprises an area extracting circuit 103 for extracting SD pixel data from SD pixel data SD output from the A/D converter 102, SD pixel data being in an area corresponding to predetermined HD pixel data to be estimated out of said pixel data composing the video signal $S_{2N}$ (hereinafter called HD pixel data), and an adaptive dynamic range coding (ADRC) circuit 104 for applying ADRC processing to SD pixel data extracted by the area extracting circuit 103, deciding a class (a space class) mainly showing a waveform in space and outputting class information.

Figure 9:
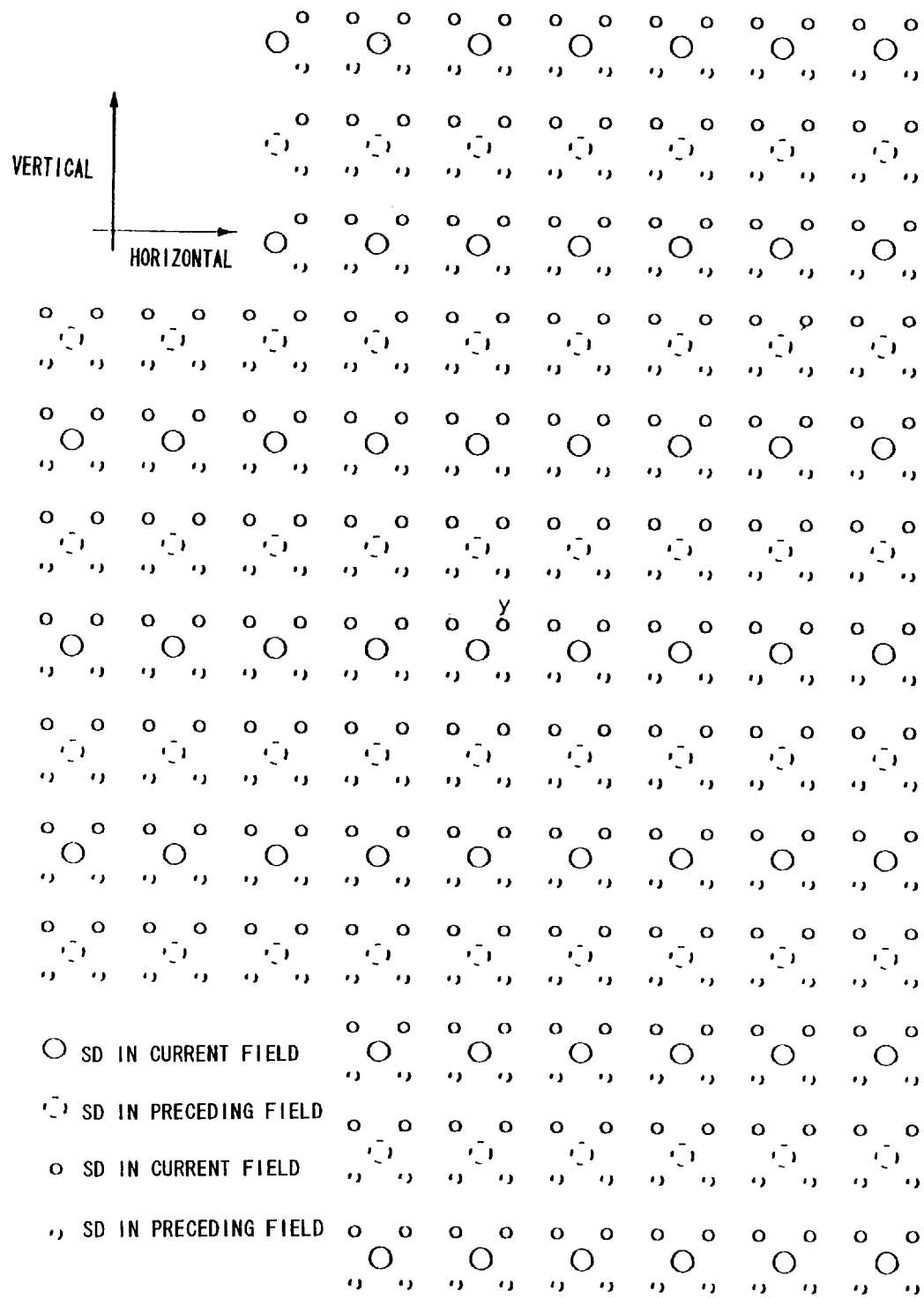
FIG. 9 is a sketch drawing explaining positional relationship between SD pixels and HD pixels.
Figure 10:
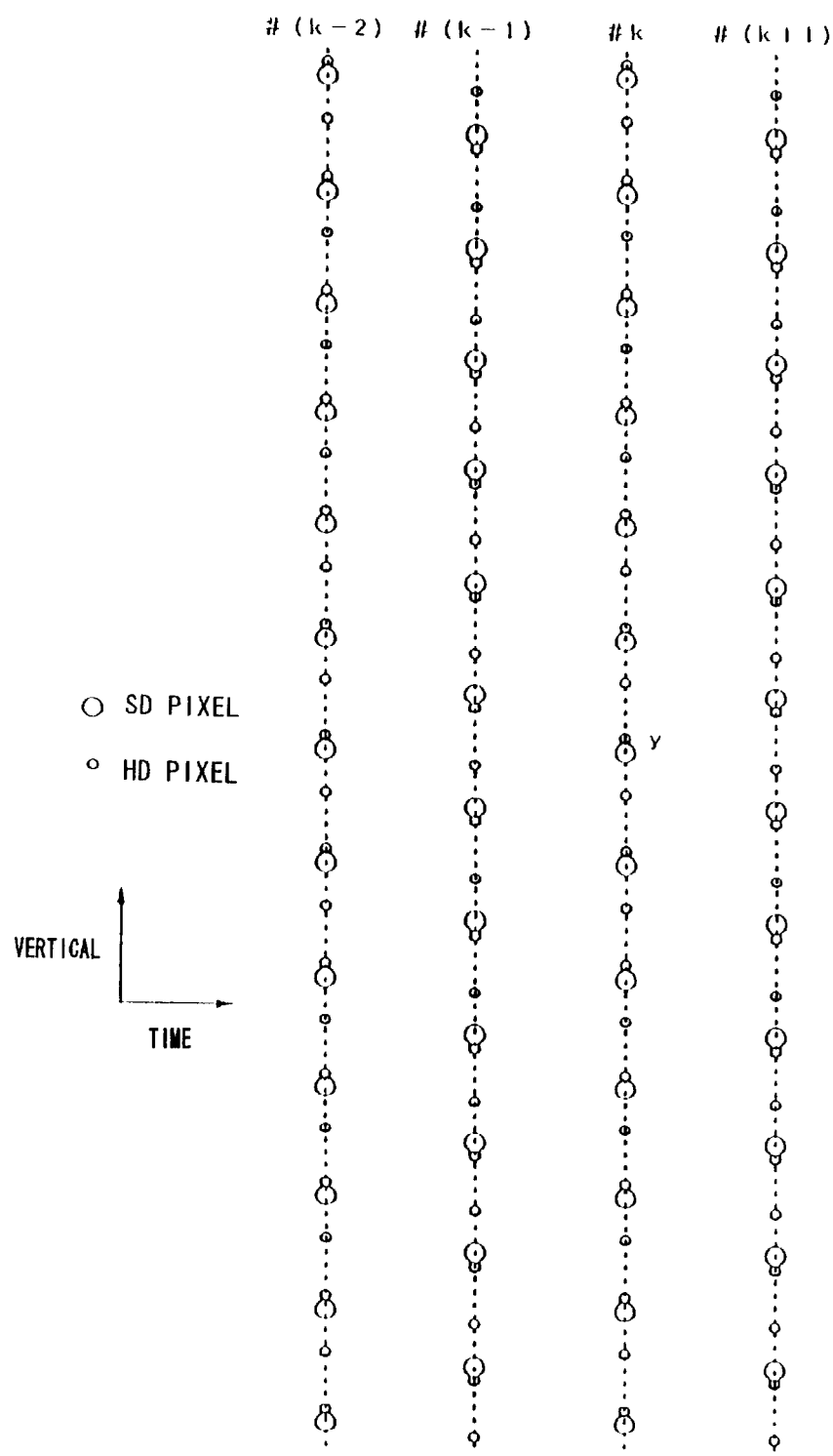
FIG. 10 is a sketch drawing explaining positional relationship between SD pixels and HD pixels.

FIGS. 9 and 10 shows positional relationship between SD pixel and HD pixel. If HD pixel data y is to be estimated, the area extracting circuit 103 extracts SD pixel data $k_1$ to $k_5$, for example, in the vicinity of the HD pixel data y, as shown in FIG. 11.

The ADRC circuit 104 executes operation such that each SD pixel data is compressed, for example, from 8-bit data to 2-bit data, to make a pattern showing the level distribution of the SD pixel data extracted by the area extracting circuit 103. Compressed data (a requantized code) qi corresponding to each SD pixel data is output as the class information of a space class from the ADRC circuit 104.

Originally, ADRC is an adaptive requantizing method developed for high-performance coding for a video tape recorder (VTR). However, as the ADRC can represent the local pattern of a signal level efficiently by short word length, the ADRC is used in this embodiment for making a pattern showing the level distribution of SD pixel data extracted by the area extracting circuit 103.

In the ADRC circuit 104, if the maximum value of SD pixel data in an area is MAX, the minimum value thereof is MIN, a dynamic range in the area is DR (=MAX−MIN+1) and the number of requantization bits is p, a code qi for requantizing each SD pixel data ki in the area is acquired by operation shown in the following expression (1). However, [ ] in the expression (1) means round-down processing. When Na pieces of the SD pixel data are extracted in the area extracting circuit 103, it is estimated that i is any number of 1 to Na.

$$qi = [(ki - \text{MIN} + 0.5) \cdot 2^p / DR] \quad (1)$$

The conversion circuit 100 comprises an area extracting circuit 105 for extracting SD pixel data in an area corresponding to predetermined HD pixel data to be estimated from SD pixel data output from the A/D converter 102, and a motion class deciding circuit 106 for deciding a class for showing the degree of motion mainly (a motion class) based upon SD pixel data extracted by the area extracting circuit 105 and outputting class information.

Figure 12:
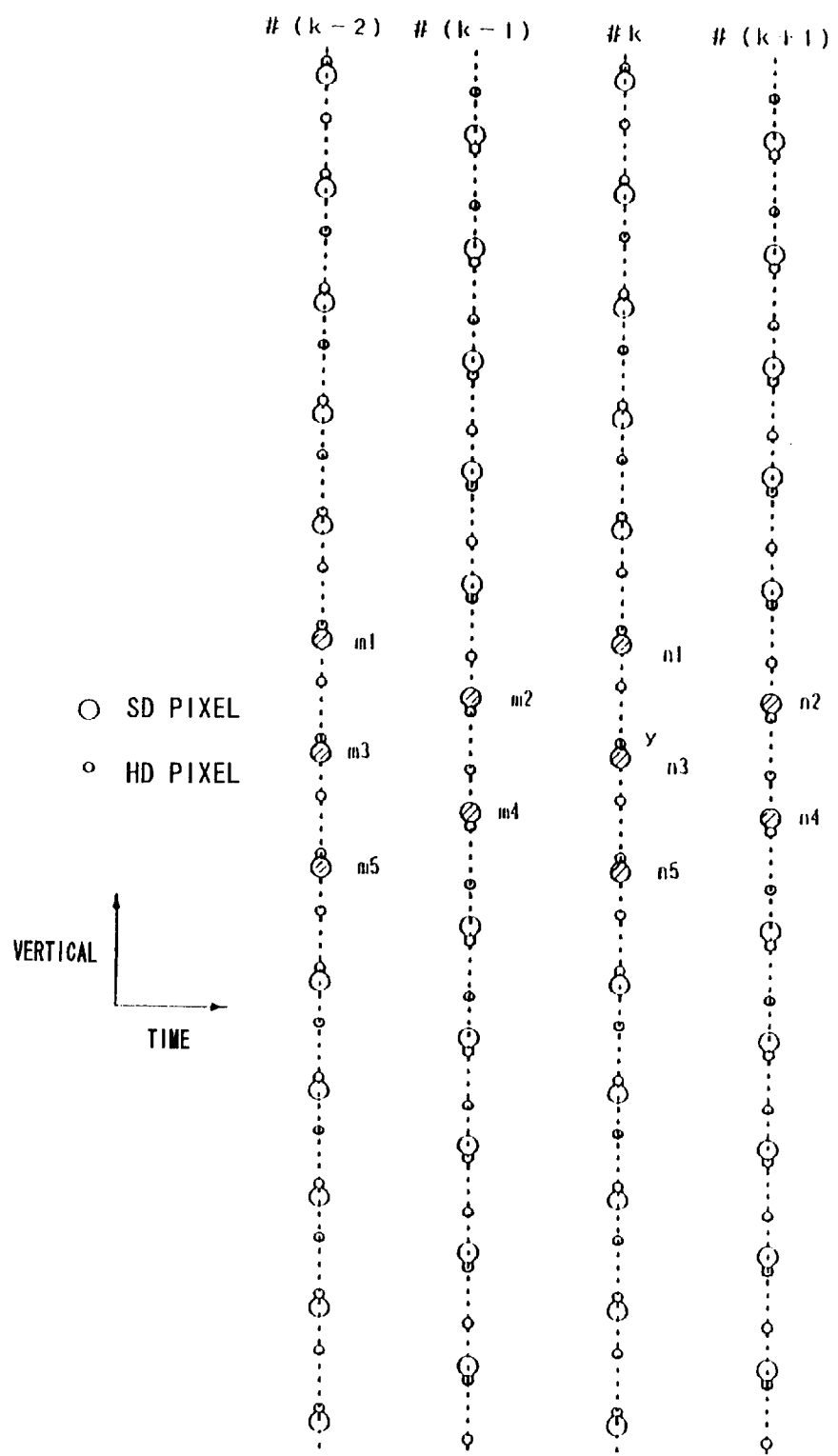
FIG. 12 is a sketch drawing explaining SD pixel data used for classifying it into a motion class.

The area extracting circuit 105 illustratively extracts ten pieces of SD pixel data $m_1$ to $m_5$ and $n_1$ to $n_5$ in the vicinity of the HD pixel data y, as shown in FIG. 12, when the HD pixel data y is to be estimated.

In the motion class-deciding circuit 106, interframe differential is calculated based upon SD pixel data, mi and ni, extracted by the area extracting circuit 105. Further, threshold processing is applied to the average value of the absolute value of the interframe differential and the motion class deciding circuit 106 outputs the information MV of a motion class, which is an index of motion.

That is, in the motion class-deciding circuit 106, the average value AV of the absolute value of the interframe differential is calculated according to an expression (2). When ten pieces of SD pixel data, $m_1$ to $m_5$ and $n_1$ to $n_5$, are extracted by the area extracting circuit 105 as described above, Nb in the following expression (2) is 5.

$$AV = \frac{\sum_{i=1}^{Nb} |mi - ni|}{Nb} \quad (2)$$

The motion class-deciding circuit 106 compares the average value AV calculated as described above with one or plural thresholds and acquires class information MV. For example, three thresholds, $th_1$, $th_2$ and $th_3$ ($th_1 < th_2 < th_3$), are prepared and when $AV \leq th_1$ in case four motion classes are decided, MV is 0. When $th_1 < AV \leq th_2$, MV is 1. When $th_2 < AV \leq th_3$, MV is 2. When $th_3 < AV$, MV is 3.

The conversion circuit 100 comprises a class code generating circuit 107 for acquiring a class code CL showing a class to which HD pixel data to be estimated belongs based upon the requantized code qi as the class information of the space class output from the ADRC circuit 104 and the class information MV of a motion class output from the motion class deciding circuit 106. In the class code generating circuit 107, the operation of a class code CL is executed according to an expression (3). In the following expression (3), Na denotes the number of SD pixel data extracted by the area extracting circuit 103 and p denotes the number of requantization bits in the ADRC circuit 104.

$$CL = \sum_{i=1}^{Na} qi(2^p)^i + MV \cdot 2^{pNa} \quad (3)$$

The conversion circuit 100 comprises a ROM table 108 for storing coefficient data for a linear estimation expression every class, which is used in an estimation arithmetic circuit 110 described later. The class code generating circuit 107 supplies a class code CL to the ROM table 108 as reading address information. Hereby, the ROM table 108 outputs coefficient data wi corresponding to a class code CL.

The conversion circuit 100 comprises an area extracting circuit 109 for extracting SD pixel data in an area corresponding to predetermined HD pixel data to be estimated, from the SD pixel data SD output from the A/D converter 102, and an estimation arithmetic circuit 110 for operating HD pixel data to be estimated based upon the SD pixel data extracted by the area extracting circuit 109 and the coefficient data wi read from the ROM table 108 as described above.

Figure 13:
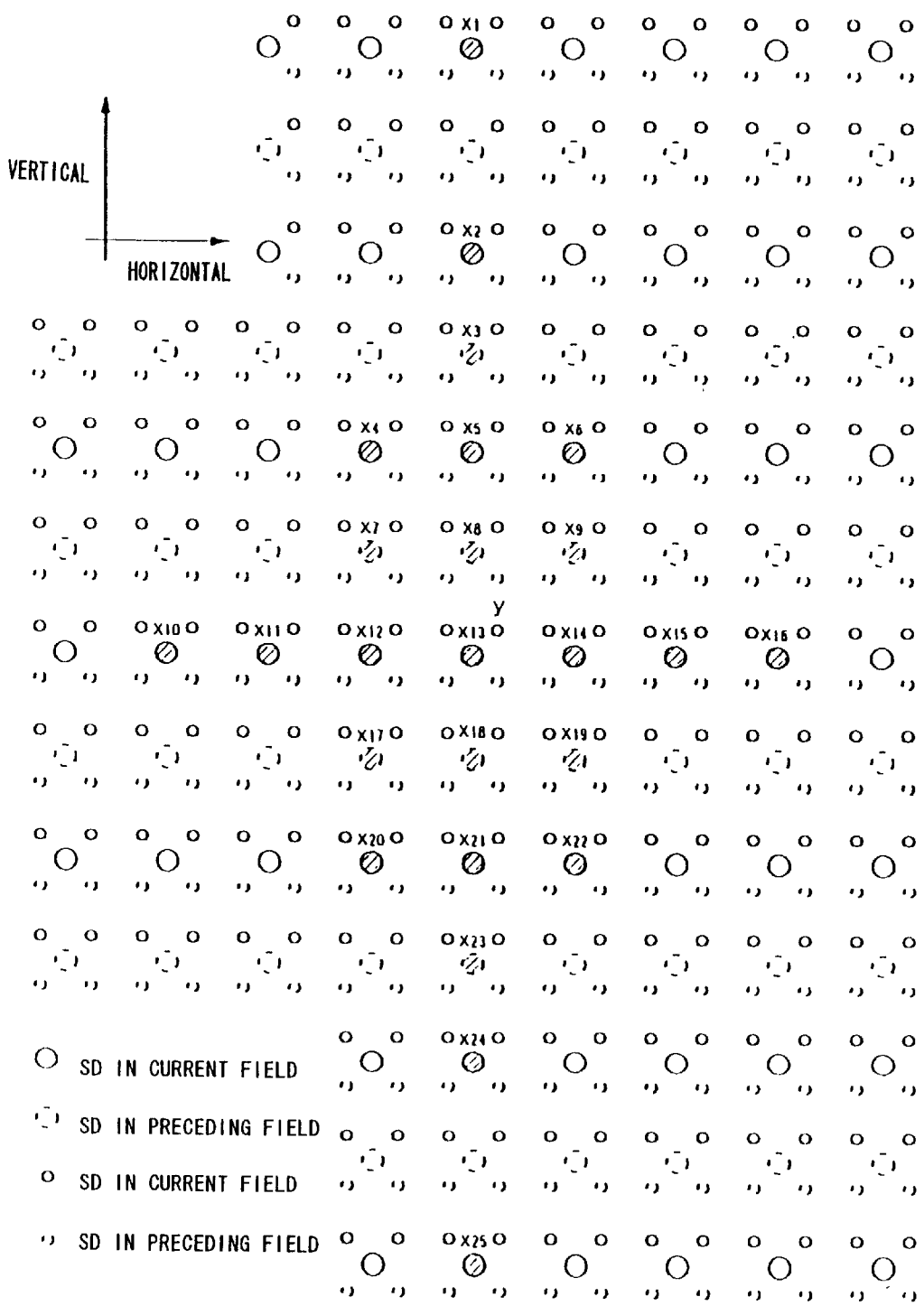
FIG. 13 is a sketch drawing explaining SD pixel data used for estimation operation.

The area extracting circuit 109 illustratively extracts SD pixel data, $x_1$ to $x_{25}$, in the vicinity of the HD pixel data y, as shown in FIG. 13, when the HD pixel data y is to be estimated. The estimation arithmetic circuit 110 operates the HD pixel data y to be estimated according to a linear estimation expression (4) based upon the SD pixel data xi extracted by the area extracting circuit 109 and the coefficient data wi read from the ROM table 108. When 25 pieces of SD pixel data, $x_1$ to $x_{25}$, are extracted by the area extracting circuit 109 as described above, n in the expression (4), that is, the number of taps is 25.

$$y = \sum_{i=1}^{n} wi \cdot xi \quad (4)$$

The conversion circuit 100 comprises a D/A converter 111 for converting HD pixel data sequentially output from the estimation arithmetic circuit 110 to an analog signal and acquiring a video signal $S_{2N}$, and an output terminal 112 for outputting the video signal $S_{2N}$.

An operation of the conversion circuit 100 shown in FIG. 8 will be described below. The A/D converter 102 converts the video signal $S_{NT}$ according to NTSC to a digital signal and generates SD pixel data. The area extracting circuit 103 extracts said SD pixel data ki in a predetermined area corresponding to predetermined HD pixel data y to be estimated out of HD pixel data composing a video signal $S_{2N}$, from SD pixel data output from the A/D converter 102. The ADRC circuit 104 performs the ADRC processing to each extracted SD pixel data ki and acquires a requantized code qi as the class information of a space class (mainly, classification for representing a waveform in space).

The area extracting circuit 105 extracts the SD pixel data, mi and ni, in a predetermined area corresponding to the above HD pixel data y to be estimated, from the SD pixel data output from the A/D converter 102. The motion class-deciding circuit 106 acquires the class information MV showing a motion class (mainly, classification for showing the degree of motion) based upon the extracted SD pixel data, mi and ni.

The class code generating circuit 107 acquires the class code CL as class information showing a class to which HD pixel data y to be estimated belongs based upon the above motion class information MV and a requantized code qi acquired by the above ADRC circuit 104. The class code CL is supplied to the ROM table 108 as reading address information and the ROM table 108 transmits coefficient data wi corresponding to a class to which HD pixel data y to be estimated belongs.

The area extracting circuit 109 extracts SD pixel data xi in a predetermined area corresponding to the above HD pixel data y to be estimated, from the SD pixel data output from the A/D converter 102. The estimation arithmetic circuit 110 operates Hd pixel data y to be estimated using a linear estimation expression based upon the extracted SD pixel data xi and the coefficient data wi read from the ROM table 108 as described above. The D/A converter 111 converts the HD pixel data y sequentially output from the estimation arithmetic circuit 110 to an analog signal to acquire a video signal $S_{2N}$ and the video signal $S_{2N}$ is output to the output terminal 112.

The ROM table 108 stores the coefficient data in a linear estimation expression corresponding to each class as described above. The coefficient data is generated by learning beforehand. First, its learning method will be described. The following is an example that coefficient data wi (i=1 to n) is acquired by a least square method based upon a linear estimation expression (4). For a generalized example, an observation equation (5) incase X is input data, W is a predictive coefficient and Y is a predictive value will be examined. In the expression (5), m denotes the number of learned data and n denotes the number of predictive taps.

$$XW=T \tag{5}$$

$$X = \begin{bmatrix} x11 & x12 & \cdots & x1n \\ x21 & x22 & \cdots & x2n \\ \cdots & \cdots & \cdots & \cdots \\ xm1 & xm2 & \cdots & xmn \end{bmatrix}, \; W = \begin{bmatrix} w1 \\ w2 \\ \cdots \\ wn \end{bmatrix}, \; Y = \begin{bmatrix} y1 \\ y2 \\ \cdots \\ ym \end{bmatrix}$$

The least square method is applied to data collected by the observation equation (5). A residual equation (6) will be examined based upon the observation equation (5).

$$XW = Y + E, \; E = \begin{bmatrix} e1 \\ e2 \\ \cdots \\ em \end{bmatrix} \tag{6}$$

It is considered based upon the residual equation (6) that each wi becomes the most probable value in case a condition for minimizing $e^2$ in the following expression (7) comes into effect. That is, a condition shown in the following expression (8) has only to be considered.

$$e^2 = \sum_{i=1}^{m} ei^2 \tag{7}$$

$$e_1 \frac{\partial e_1}{\partial w_1} + e_2 \frac{\partial e_2}{\partial w_1} + \cdots + e_m \frac{\partial e_m}{\partial w_1} = 0 (i = 1, 2, \cdots, n) \tag{8}$$

That is, n pieces of conditions based upon i in the expression (8) have to be considered and $w_1, w_2, \ldots w_n$ which meet those conditions have only to be calculated. An expression (9) is acquired based upon the residual equation (6). Further, an expression (10) is acquired based upon the expressions (9) and (5).

$$\frac{\partial e_1}{\partial w_1} = x_{i1}, \; \frac{\partial e_1}{\partial w_2} = x_{i2}, \cdots, \frac{\partial e_i}{\partial w_n} = x_{in} (i = 1, 2, \cdots, m) \tag{9}$$

$$\sum_{i=1}^{m} e_i x_{i1} = 0, \; \sum_{i=1}^{m} e_i x_{i2} = 0, \cdots, \sum_{i=1}^{m} e_i xin = 0 \tag{10}$$

A normal equation (11) is acquired based upon the expressions (6) and (10).

As, in the normal expression (11), equations of the same number as an unknown number n can be set up, the most probable value of each wi can be acquired. In this case, simultaneous equations are solved using Gauss-Jordan method of elimination and others.

Figure 14:
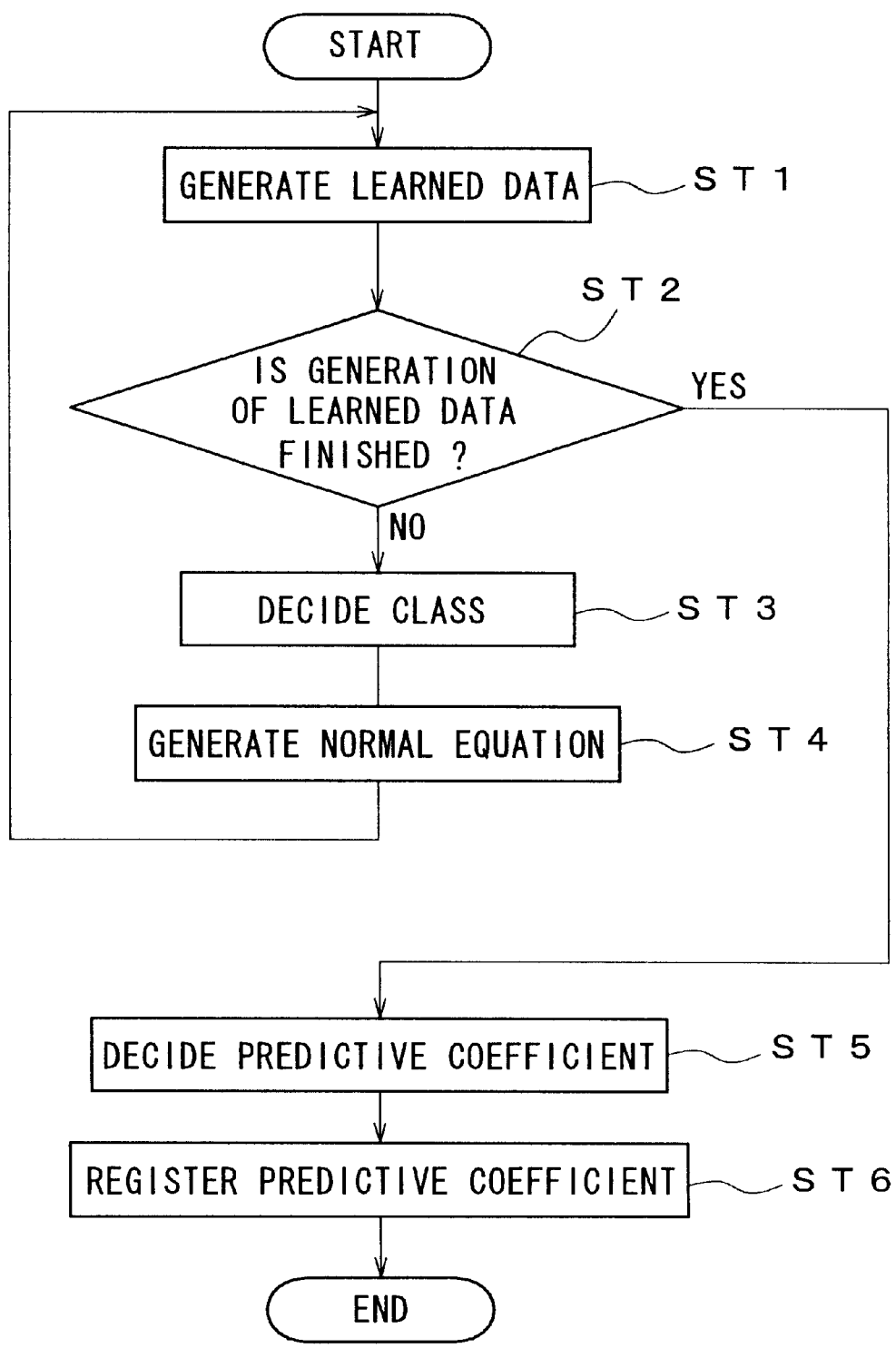
FIG. 14 is a flowchart showing the learning flow of a prediction coefficient.

FIG. 14 is a flowchart showing the above learning of a predictive coefficient. An input signal and a teaching signal for prediction should be prepared beforehand.

First, in a step ST1, the combination of a predictive pixel value acquired based upon the teaching signal and n pieces of pixel values of a predictive tap acquired based upon the input signal is generated as learned data. Next, in a step ST2, it is judged whether the generation of learned data is finished or not. When the generation of learned data is not finished, a class to which the predictive pixel value in the learned data belongs is decided in a step ST3. The class is decided based upon predetermined number of pixel values acquired from the input signal corresponding to the predictive pixel value, and a space class and others are decided by the above ADRC processing.

In a step ST4, a normal equation shown in an expression (11) is generated using the learned data generated in the step ST1, that is, a predictive pixel value and n pieces of pixel values of a predictive tap. The operation of the steps ST1 to ST4 is repeated until the generation of learned data is finished and a normal equation in which many learned data are registered is generated.

When the generation of learned data is finished in the step ST2, a normal equation generated every class is solved in a step ST5 and n pieces of predictive coefficients wi every class are acquired. In a step ST6, the predictive coefficients wi are registered in a memory the addresses of which are divided every class. The learning flow is finished.

Figure 15:
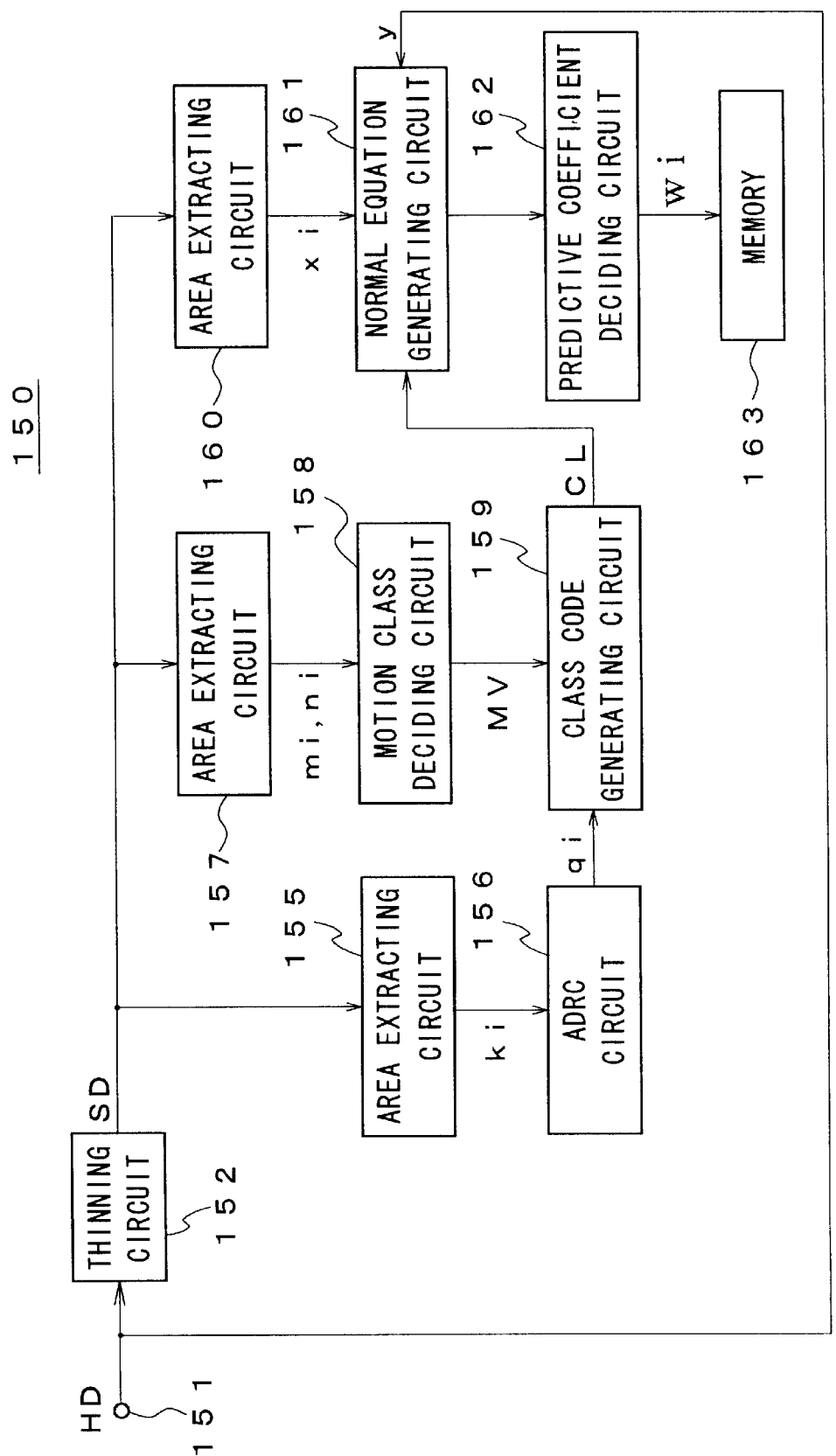
FIG. 15 is a block diagram showing an example of the configuration of a coefficient data generator.

Next, a coefficient data generator 150 will be described in detail. The coefficient data generator 150 previously generates coefficient data wi stored every class in the ROM table 108 of the conversion circuit 100 shown in FIG. 8 according to the above principle of learning. FIG. 15 shows an example of the configuration of the coefficient data generator 150.

The above coefficient data generator 150 comprises an input terminal 151 to which HD pixel data composing a video signal $S_{2N}$ as a teaching signal is supplied, and a thinning circuit 152 for applying horizontal and vertical thinning filter processing to the HD pixel data and acquiring SD pixel data composing a video signal $S_{NT}$ according to NTSC as an input signal. The thinning circuit 152 performs the thinning processing to HD pixel data, not shown, so that the number of lines in a vertical direction in a filed becomes a half by a vertical thinning filer and further, the number of pixels in a horizontal direction in the field becomes a half by a horizontal thinning filter. FIGS. 9 and 10 show positional relationship between SD pixel and HD pixel.

The coefficient data generator 150 also comprises an area extracting circuit 155 for sequentially extracting SD pixel data SD in a predetermined area from the SD pixel data SD $$\begin{cases} \left(\sum_{j=1}^{m} x_{j1}x_{j1}\right)w1 + \left(\sum_{j=1}^{m} x_{j1}x_{j2}\right)w2 + \cdots + \left(\sum_{j=1}^{m} x_{j1}x_{jn}\right)wn = \left(\sum_{j=1}^{m} x_{j1}y_{j}\right) \\ \left(\sum_{j=1}^{m} x_{j2}x_{j1}\right)w1 + \left(\sum_{j=1}^{m} x_{j2}x_{j2}\right)w2 + \cdots + \left(\sum_{j=1}^{m} x_{j2}x_{jn}\right)wn = \left(\sum_{j=1}^{m} x_{j2}y_{j}\right) \\ \left(\sum_{j=1}^{m} x_{jn}x_{j1}\right)w1 + \left(\sum_{j=1}^{m} x_{jn}x_{j2}\right)w2 + \cdots + \left(\sum_{j=1}^{m} x_{jn}x_{jn}\right)wn = \left(\sum_{j=1}^{m} x_{jn}y_{j}\right) \end{cases} \tag{11}$$

output from the thinning circuit 152 according to respective plural pieces of HD pixel data as a predictive pixel value out of HD pixel data supplied to the input terminal 151, and an ADRC circuit 156 for applying ADRC processing to the SD pixel data sequentially extracted by the area extracting circuit 155, deciding class (a space class) representing a waveform in space mainly and outputting class information.

The area extracting circuit 155 is composed like the area extracting circuit 103 in the above conversion circuit 100. The extracting circuit 155 illustratively extracts SD pixel data $k_1$ to $k_5$ in the vicinity of HD pixel data y, as shown in FIG. 11, according to HD pixel data y as a predictive pixel value. The ADRC circuit 156 is also composed like the ADRC circuit 104 in the above conversion circuit 100. The ADRC circuit 156 outputs a requantized code qi as class information showing a space class every SD pixel data in a predetermined area extracted respectively corresponding to each HD pixel data as a predictive pixel value.

The coefficient data generator 150 comprises an area extracting circuit 157 for sequentially extracting SD pixel data in a predetermined area from SD pixel data SD output from the thinning circuit 152 respectively corresponding to each HD pixel data as the above predictive pixel value, and a motion class deciding circuit 158 for deciding a class (a motion class) for showing the degree of motion mainly based upon SD pixel data extracted by the area extracting circuit 157 and outputting class information.

The area extracting circuit 157 is composed like the area extracting circuit 105 in the above conversion circuit 100. The area extracting circuit 157 illustratively extracts ten pieces of SD pixel data $m_1$ to $m_5$ and $n_1$ to $n_5$ in the vicinity of HD pixel data y, as shown in FIG. 12, corresponding to HD pixel data y as a predictive pixel value. The motion class deciding circuit 158 is also composed like the motion class deciding circuit 106 in the above conversion circuit 100. The motion class deciding circuit 158 outputs the class information MV of a motion class, which is an index of motion, every SD pixel data in a predetermined area extracted respectively corresponding to each HD pixel data as predictive pixel value.

The coefficient data generator 150 comprises a class code generating circuit 159 for acquiring a class code CL based upon a requantized code qi as the class information of a space class output from the ADRC circuit 156 and the class information MV of a motion class output from the motion class deciding circuit 158. The class code generating circuit 159 is composed like the class code generating circuit 107 in the above conversion circuit 100. The class code generating circuit 159 outputs a class code CL showing a class to which HD pixel data belongs respectively corresponding to each HD pixel data as a predictive pixel value.

The coefficient data generator 150 comprises an area extracting circuit 160 for sequentially extracting SD pixel data in a predetermined area as a predictive tap value from SD pixel data SD output from the thinning circuit 152 respectively corresponding to each HD pixel data as a predictive pixel value. The area extracting circuit 160 is composed like the area extracting circuit 109 in the above conversion circuit 100. The area extracting circuit 160 illustratively extracts 25 pieces of SD pixel data, $x_1$ to $x_{25}$, in the vicinity of HD pixel data y, as shown in FIG. 13, corresponding to HD pixel data y as a predictive pixel value.

The coefficient data generator 150 comprises a normal equation generating circuit 161 for generating a normal equation (refer to the expression (11)) for generating n pieces of coefficient data wi every class based upon each HD pixel data y as a predictive pixel value acquired according to HD pixel data supplied to the input terminal 151, SD pixel data xi as a predictive tap pixel value sequentially extracted by the area extracting circuit 160 respectively corresponding to each HD pixel data y as a predictive pixel value, and a class code CL output from the class code generating circuit 159 respectively corresponding to each HD pixel data y as a predictive pixel value.

In this case, the above learned data is generated by the combination of one piece of HD pixel data y and n pieces of the predictive tap pixel values corresponding to the HD pixel data. Therefore, the normal equation generating circuit 161 generates a normal equation in which many learned data are registered. The timing of SD pixel data xi supplied from the area extracting circuit 160 to the normal equation generating circuit 161 can be performed by arranging a delay circuit for timing, not shown, before the area extracting circuit 160.

The coefficient data generator 150 comprises a predictive coefficient deciding circuit 162 for acquiring coefficient data (a predictive coefficient) wi every class by receiving the data of a normal equation generated every class by the normal equation generating circuit 161 and solving the normal equation generated every class, and a memory 163 for storing the above acquired coefficient data wi. In the predictive coefficient deciding circuit 162, a normal equation is solved, for example, by a sweep method and others and then, the coefficient data wi is acquired.

An operation of the coefficient data generator 150 shown in FIG. 12 will be described below. HD pixel data HD composing a video signal $S_{2N}$ as a teaching signal is supplied to the input terminal 151. The thinning circuit 152 performs the horizontal and vertical thinning processing and others to the HD pixel data HD and acquires SD pixel data SD composing a video signal $S_{NT}$ according to NTSC as an input signal.

The area extracting circuit 155 extracts the SD pixel data ki in a predetermined area sequentially from the SD pixel data SD output from the thinning circuit 152 respectively corresponding to each HD pixel data y as a predictive pixel value acquired from HD pixel data HD supplied to the input terminal 151. The ADRC circuit 156 performs ADRC processing to each extracted SD pixel data ki and acquires a requantized code qi as the class information of a space class (mainly, classification for representing a waveform in space).

The area extracting circuit 157 extracts SD pixel data, mi and ni, in a predetermined area sequentially from the SD pixel data SD output from the thinning circuit 152 respectively corresponding to each HD pixel data y as a predictive pixel value. The motion class deciding circuit 158 acquires class information MV showing a motion class (mainly, classification for showing the degree of motion) based upon each extracted SD pixel data, mi and ni. The class code generating circuit 159 acquires a class code CL as class information showing a class to which each HD pixel data y as a predictive pixel value belongs, based upon the class information MV and the requantized code qi acquired by the above ADRC circuit 156.

The area extracting circuit 160 extracts SD pixel data xi in a predetermined area sequentially from SD pixel data SD output from the thinning circuit 152 respectively corresponding to each HD pixel data y as a predictive pixel value. The normal equation generating circuit 161 generates a normal equation for generating n pieces of coefficient data wi every class based upon each HD pixel data y as a predictive pixel value acquired from HD pixel data HD supplied to the input terminal 151, SD pixel data xi as a predictive tap pixel value sequentially extracted by the area extracting circuit 160 respectively corresponding to each HD pixel data y as a predictive pixel value and a class code CL output from the class code generating circuit 159 respectively corresponding to each HD pixel data y as a predictive pixel value. In the predictive coefficient deciding circuit 162, the normal equation is solved, the coefficient data wi every class is acquired and the coefficient data wi is stored in the memory 163 the addresses of which are divided every class.

In the above description, as information compressing means for making a pattern of a spacial waveform with the small number of bits, the ADRC circuits 104 and 156 are provided. However, this invention is not limited to these circuits. Any information compressing means that may represent a pattern of a signal waveform with the small number of bits may be also provided, and compression means such as differential pulse code modulation (DPCM) and vector quantization (VQ) may be also used.

As described above, in these embodiments, the image adaptive double-speed conversion circuit 100 in the video signal converter 13 doubles the number of lines in relation to a vertical direction, afterward, the interpolation circuit 180 increases the number of lines by 1.6 times, and finally, line number conversion processing of 3.2 times is executed (see FIG. 2). In this case, as image adaptive conversion processing is executed in the conversion circuit 100, a video signal $S_{2N}$ of high image quality is acquired without depressing a video signal $S_{NT}$ according to NTSC. Therefore, the deterioration of the quality of an image is reduced, compared with the conventional type that the number of lines in a vertical direction is increased by 3.2 times by mere interpolation processing, so that a video signal $S_{XG}$ of high image quality corresponding to XGA is acquired. The liquid crystal display 15 can display an image of high image quality.

Various circuits exist in addition to the image adaptive double-speed conversion circuit 100 shown in FIG. 5. Therefore, an arbitrary circuit may be substituted for the part of the double-speed conversion circuit 100 if necessary by composing the video signal converter 13 by the image adaptive double-speed conversion circuit 100 and the interpolation circuit 180.

In the above embodiments, the number of lines in a vertical direction is finally increased by 3.2 times. However, if the final conversion magnification of the number of lines in a vertical direction or the number of pixels in a horizontal direction is larger than double, the video signal converter 13 composed of the image adaptive double-speed conversion circuit 100 and the interpolation circuit 180 is used as described above and a video signal of high image quality can be acquired. This case can be easily executed only by changing conversion magnification in the interpolation circuit 180. That is, even if the final conversion magnification of the number of lines in a vertical direction or the number of pixels in a horizontal direction is changed, the existing double-speed conversion circuit 100 can be used as it is and then, a video signal of high image quality can be acquired.

Also, in the above embodiments, a video signal $S_{2N}$ according to the interlaced scanning method in which the number of lines in a vertical direction and the number of pixels in a horizontal direction are respectively doubled, is acquired based upon a video signal $S_{NT}$ according to NTSC. Further, a video signal $S_{XG}$ corresponding to XGA is acquired based upon the video signal $S_{2N}$. However, a video signal according to the sequential scanning method in which the number of lines in a vertical direction and the number of pixels in a horizontal direction are respectively doubled is acquired based upon a video signal $S_{NT}$ according to NTSC and a video signal $S_{XG}$ corresponding to XGA may be also acquired based upon the video signal.

Also, in the above embodiments, a video signal SXG corresponding to XGA is acquired based upon a video signal $S_{NT}$ according to NTSC. However, the present invention can be also similarly applied to a case that a video signal $S_{XG}$ corresponding to XGA is acquired based upon a video signal $S_{PL}$ according to PAL.

Also, in the above embodiments, the video signal converter 13 is composed of the image adaptive double-speed conversion circuit 100 and the interpolation circuit 180. However, even if the video signal converter 13 is composed of an image adaptive conversion circuit having the conversion magnification of other than 2, and an interpolation circuit, the similar effect can be acquired.

Also, in the above embodiments, a video signal $S_{XG}$ corresponding to XGA is acquired based upon a video signal $S_{NT}$ according to NTSC. However, it need scarcely be said that the present invention can be also similarly applied to a case that a video signal corresponding to super VGA (SVGA), SXGA, UXGA, 1125i and others is acquired based upon a video signal $S_{NT}$ according to NTSC and a video signal $S_{PL}$ according to PAL.

According to the present invention, a second video signal wherein the number of lines in a vertical direction or the number of pixels in a horizontal direction is increased by n times is acquired by applying image adaptive conversion processing to a first video signal and afterward, a third video signal wherein the number of lines in a vertical direction or the number of pixels in a horizontal direction is increased by m times is acquired by applying another conversion processing to the second video signal. Therefore, the second video signal acquired by the image adaptive conversion processing is a video signal of high image quality and the third video signal acquired by applying conversion processing to the second video signal is a video signal of high image quality free of the deterioration of the quality of an image in which the number of lines in a vertical direction or the number of pixels in a horizontal direction of the video signal is increased by 'n×m' times by applying mere interpolation processing to the first video signal. Therefore, according to the present invention, in case the number of lines in a vertical direction or the number of pixels in a horizontal direction is increased by times exceeding double, a video signal of high image quality can be acquired.

Also, according to this invention, the third video signal in which the number of lines in a vertical direction or the number of pixels in a horizontal direction of the first video signal is increased by 'n×m' times, is finally acquired. More in detail, the second video signal in which the number of lines in a vertical direction or the number of pixels in a horizontal direction of the first video signal is increased by n times is acquired by applying image adaptive conversion processing to the first video signal, and further, the third video signal in which the number of lines in a vertical direction or the number of pixels in a horizontal direction of the second video signal is increased by m times is acquired by applying conversion processing, for example, interpolation to the second video signal. Therefore, even if the final conversion magnification of the number of lines in a vertical direction or the number of pixels in a horizontal direction is changed, the case can be easily processed only by changing conversion magnification m in interpolation processing. That is, even if the final conversion magnification of the number of lines in a vertical direction or the number of pixels in a horizontal direction is changed, the existing image adaptive converter, for example, the double-speed converter can be used and a video signal of high image quality can be acquired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A video signal converter, comprising:
   an image adaptive first converter for increasing the number of lines in a vertical direction and the number of pixels in a horizontal direction of a first video signal to acquire a second video signal; the first converter having:
      first pixel extracting means for extracting pixels in a first area from said first video signal;
      class deciding means for detecting a level distribution pattern of the extracted pixels from the first area, deciding a class including a predetermined pixel signal composing said second video signal to be estimated based upon the level distribution pattern, and outputting class information including said class;
      coefficient data storing means for storing coefficient data in a linear estimation expression corresponding to a predetermined plurality of classes;
      coefficient data output means for reading the coefficient data corresponding to said class in the class information output from said class deciding means and outputting the corresponding coefficient data;
      second pixel extracting means for extracting pixels in a second area from said first video signal; and
      video signal output means for operating on said predetermined pixel signal composing said second video signal, using said linear estimation expression based upon the corresponding coefficient data output from said coefficient data output means and the extracted pixels from the second area, and for outputting the operated signal; and
   a second converter for increasing the number of lines in the vertical direction and the number of pixels in the horizontal direction of said second video signal to acquire a third video signal.

2. The video signal converter according to claim 1, wherein the first converter doubles the number of lines and the number of pixels of said first video signal.

3. The video signal converter according to claim 1, wherein:
   said first video signal is a video signal according to an interlaced scanning method in which the number of lines in a vertical direction is 525;
   said first converter acquires a video signal according to the interlaced scanning method in which the number of lines in a vertical direction is 1050 as said second video signal based upon the video signal according to said interlaced scanning method in which the number of lines is 525; and
   said second converter acquires a video signal corresponding to XGA as said third video signal based upon the video signal according to said interlaced scanning method in which the number of lines is 1050.

4. The video signal converter according to claim 1, wherein:
   said first video signal is a video signal according to an interlaced scanning method in which the number of lines in a vertical direction is 625;
   said first converter acquires a video signal according to the interlaced scanning method in which the number of lines in a vertical direction is 1250 as said second video signal based upon the video signal according to said interlaced scanning method in which the number of lines is 625; and
   said second converter acquires a video signal corresponding to XGA as said third video signal based upon the video signal according to said interlaced scanning method in which the number of lines is 1250.

5. The video signal converter according to claim 1, wherein:
   said first video signal is a video signal according to an interlaced scanning method; and
   said second video signal is a video signal according to an interlaced scanning method.

6. The video signal converter according to claim 1, wherein:
   said first video signal is a video signal according to an interlaced scanning method; and
   said second video signal is a video signal according to a sequential scanning method.

7. The video signal converter according to claim 1, wherein:
   said first converter is composed of hardware; and
   said second converter is composed of a digital signal processor.

8. The video signal converter according to claim 1, wherein:
   said second converter applies any of the nearest interpolation, linear interpolation and cubic interpolation to said second video signal to acquire said third video signal.

9. A video signal conversion method, comprising the steps of:
   a first conversion step of increasing the number of lines in a vertical direction and the number of pixels in a horizontal direction of a first video signal to acquire a second video signal by applying an image adaptive conversion processing to the first video signal; the first conversion step having:
      a first pixel extracting step of extracting pixels in a first area from said first video signal;
      a class deciding step of detecting a level distribution pattern of the extracted pixels from the first area, deciding a class including a predetermined pixel signal composing said second video signal to be estimated based upon the level distribution pattern, and outputting class information including said class;
      a coefficient data storing step of storing coefficient data in a linear estimation expression corresponding to a predetermined plurality of classes;
      a coefficient data output step of reading the coefficient data corresponding to said class in the class information output from said class deciding means and outputting the corresponding coefficient data;
      a second pixel extracting step of extracting pixels in a second area from said first video signal; and
      a video signal output step of operating on said predetermined pixel signal composing said second video signal, using said linear estimation expression based upon the corresponding coefficient data output from said coefficient data output means and the extracted pixels from the second area, and for outputting the operated signal; and a second conversion step of increasing the number of lines in the vertical direction and the number of pixels in the horizontal direction of the second video signal to acquire a third video signal by applying a conversion processing to said second video signal.

10. An image display unit, comprising a video signal converter for converting the number of lines or the number of pixels of an input video signal to acquire an output video signal, and an image display for displaying an image based upon said output video signal, said video signal converter comprises:

an image adaptive first converter for increasing the number of lines and the number of pixels of a first video signal as said input video signal to acquire a second video signal; the first converter having:

first pixel extracting means for extracting pixels in a first area from said first video signal;

class deciding means for detecting a level distribution pattern of the extracted pixels from the first area, deciding a class including a predetermined pixel signal composing said second video signal to be estimated based upon the level distribution pattern, and outputting class information including said class;

coefficient data storing means for storing coefficient data in a linear estimation expression corresponding to a predetermined plurality of classes;

coefficient data output means for reading the coefficient data corresponding to said class in the class information output from said class deciding means and outputting the corresponding coefficient data;

second pixel extracting means for extracting pixels in a second area from said first video signal; and video signal output means for operating on said predetermined pixel signal composing said second video signal, using said linear estimation expression based upon the corresponding coefficient data output from said coefficient data output means and the extracted pixels from the second area, and for outputting the operated signal; and a second converter for increasing the number of lines and the number of pixels of said second video signal to acquire a third video signal as said output video signal.

11. A television receiver, comprising a receiving section for receiving a television broadcasting signal, a video signal converting section for acquiring a converted video signal by converting the number of lines and the number of pixels of a received video signal received by said receiving section, and an image display for displaying an image based upon said converted video signal, wherein said video signal converting section comprises:

an image adaptive first converter for increasing the number of lines and the number of pixels of a first video signal as said received video signal to acquire a second video signal; the first converter having:

first pixel extracting means for extracting pixels in a first area from said first video signal;

class deciding means for detecting a level distribution pattern of the extracted pixels from the first area, deciding a class including a predetermined pixel signal composing said second video signal to be estimated based upon the level distribution pattern, and outputting class information including said class;

coefficient data storing means for storing coefficient data in a linear estimation expression corresponding to a predetermined plurality of classes;

coefficient data output means for reading the coefficient data corresponding to said class in the class information output from said class deciding means and outputting the corresponding coefficient data;

second pixel extracting means for extracting pixels in a second area from said first video signal; and video signal output means for operating on said predetermined pixel signal composing said second video signal, using said linear estimation expression based upon the corresponding coefficient data output from said coefficient data output means and the extracted pixels from the second area, and for outputting the operated signal; and a second converter for increasing the number of lines and the number of pixels of said second video signal to acquire a third video signal as said converted video signal.

* * * * *